United States Patent [19]
Warchol et al.

[11] Patent Number: 5,980,690
[45] Date of Patent: Nov. 9, 1999

[54] CREPING ADHESIVES CONTAINING OXAZOLINE POLYMERS AND METHODS OF USE THEREOF

[75] Inventors: Joseph F. Warchol, West Norriton; Cynthia D. Walton, London Grove, both of Pa.

[73] Assignee: Hercules Incorporated, Wilmington, Del.

[21] Appl. No.: 09/138,413

[22] Filed: Aug. 24, 1998

Related U.S. Application Data

[60] Division of application No. 08/795,911, Feb. 5, 1997, Pat. No. 5,837,768, which is a continuation-in-part of application No. 08/595,939, Feb. 6, 1996, Pat. No. 5,633,309, which is a continuation of application No. 08/352,371, Dec. 8, 1994, abandoned.

[51] Int. Cl.$^6$ ....................................................... B31F 1/12
[52] U.S. Cl. ............................ 162/111; 162/112; 264/283
[58] Field of Search ..................................... 162/111, 112, 162/113; 264/283

[56] References Cited

U.S. PATENT DOCUMENTS

| | | |
|---|---|---|
| 2,926,116 | 2/1960 | Keim . |
| 3,058,873 | 10/1962 | Keim et al. . |
| 3,483,141 | 12/1969 | Litt et al. . |
| 3,640,841 | 2/1972 | Winslow et al. . |
| 3,869,342 | 3/1975 | Munjat et al. . |
| 3,869,343 | 3/1975 | Munjat et al. . |
| 4,063,995 | 12/1977 | Grossman . |
| 4,064,213 | 12/1977 | Lazorisak et al. . |
| 4,267,088 | 5/1981 | Kempf . |
| 4,436,867 | 3/1984 | Pomplun . |
| 4,501,640 | 2/1985 | Soerens . |
| 4,528,316 | 7/1985 | Soerens . |
| 4,614,762 | 9/1986 | Marans et al. . |
| 4,684,439 | 8/1987 | Soerens . |
| 4,788,243 | 11/1988 | Soerens . |
| 4,795,530 | 1/1989 | Soerens et al. . |
| 4,994,146 | 2/1991 | Soerens . |
| 5,017,644 | 5/1991 | Fuller et al. . |
| 5,602,209 | 2/1997 | Warchol . |
| 5,633,309 | 5/1997 | Warchol . |

FOREIGN PATENT DOCUMENTS

| | | |
|---|---|---|
| 979579 | 12/1975 | Canada . |
| 56-136844 | 5/1989 | Japan . |

OTHER PUBLICATIONS

J. Frump, "Oxazolines Their Preparatrion, Reactions, and Applications", *Chemical Reviews*, 71(5):483–505 (1971).

T. Kagiya et al, "Ring–Opening Polymerization of 2–Substituted 2–Oxazolines", Polymer Letters, 4:441–445 (1966).

*Primary Examiner*—Peter Chin
*Attorney, Agent, or Firm*—Howson and Howson

[57] ABSTRACT

A creping adhesive containing about 1% to about 25% by weight solids comprising a multipolymer blend of polyoxazoline, polyethyleneimine, and modified polyethyleneimine, which imparts softness and resistance to bleaching, to a cellulosic web, and methods of using same are provided.

15 Claims, No Drawings

CREPING ADHESIVES CONTAINING OXAZOLINE POLYMERS AND METHODS OF USE THEREOF

CROSS-REFERENCE TO RELATED APPLICATIONS

This is a divisional of U.S. patent application Ser. No. 08/795,911, filed Feb. 5, 1997, now U.S. Pat. No. 5,837,768, which is a continuation-in-part of U.S. patent application Ser. No. 08/595,939, filed Feb. 6, 1996, now U.S. Pat. No. 5,633,309, which is a continuation of U.S. patent application Ser. No. 08/352,371, filed Dec. 8, 1994, now abandoned.

FIELD OF THE INVENTION

This invention relates generally to the field of manufacture of creping adhesives with application to tissue and toweling products, and particularly to the properties imparted by creping adhesives to the paper machine runnability and the resulting paper softness.

BACKGROUND OF THE INVENTION

In the manufacture of wet laid facial tissue, bathroom tissue or paper towels, the fibrous web may be creped in order to provide it with the desired characteristics, such as softness and bulk. The wet creping process involves adhering the web to a rotating creping cylinder, such as a Yankee dryer, and then removing the adhered web with a doctor blade. The doctor blade impacts the web causing the web to buckle and in doing so ruptures some of the fiber-to-fiber bonds within the web. The severity of this creping action depends upon a number of factors, including the degree of adhesion between the web and the surface of the creping cylinder. Greater adhesion generally causes increased softness. In order to increase the adherence of the fibrous web to the Yankee dryer, a creping adhesive is usually sprayed onto the surface of the creping cylinder to supplement any natural adhesion the web may have when applied to the creping cylinder.

A wide variety of creping adhesives are known in the art. The paper industry's demand for faster paper machine speeds, less down time due to doctor blade changes and paper breaks, and softer and more uniform paper necessitates development of new and better creping adhesives. Desirable qualities for new and better creping adhesives that will improve paper machine runnability include: increased adhesion, dispersibility, uniform coating, and resistance to wet end chemistry changes, such as bleach out.

SUMMARY OF THE INVENTION

In one aspect, the present invention provides a creping adhesive concentrate comprising about 1% to about 25% by weight solids. Preferably, the solids contain a blend of polymers containing an oxazoline polymer, polyethyleneimine, and modified polyethyleneimine. Optionally, the blend further contains polyvinyl alcohol. Preferably, the polyoxazoline is a polyethyloxazoline. The creping adhesive of the invention coats more evenly, allowing the surface of the paper to be more uniform and improving paper machine runnability.

In another aspect, the invention provides a method for creping cellulosic paper by applying to a creping cylinder, or the cellulosic stock, the creping adhesive of the invention. When applied the creping adhesive concentrate of the invention is diluted to contain up to about 3% solids.

Other aspects and advantages of the present invention are described further in the following detailed description of the preferred embodiments thereof

DETAILED DESCRIPTION OF THE INVENTION

The present invention provides a creping adhesive composition and methods of use which produce superior paper machine runnability in terms of adhesive strength, dispersibility, and resistance to wet end chemicals such as those which cause bleach out, in the creping and drying process of cellulosic webs useful for facial tissue, bathroom tissue, paper towels, or other such products. Bleach out is a decrease in adhesive strength of the creping adhesive due to addition of bleach between dye changes.

I. The Creping Adhesive

Thus, the invention provides a creping adhesive concentrate formed of between about 5 to about 25% solids by weight, and preferably about 10% solids by weight. The solids comprise between about 1 weight percent (wt % of the concentrate) to about 5 wt % polyoxazoline, and preferably about 3 wt % polyoxazoline, between about 5 wt % to about 7 wt % polymer, and the balance water, but not excluding the use of other adjuvants including but not limited to corrosion inhibitors, preservatives, metal salts (eg. sodium, potassium, and ammonium salts of borates, oxyanions, and phosphates), and pH adjusters. All percentages provided herein are by weight unless otherwise indicated.

A. The Oxazoline Polymers

The oxazoline polymers according to this invention are water-soluble, or at least dispersible in water at the concentrations employed. These polymers can be either substituted oxazoline homopolymers or copolymers. In either event, the polymers have recurring units of the general formula

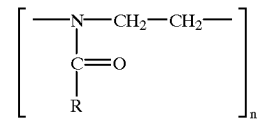

where R is any organic radical which does not significantly decrease the water-solubility or water-dispersibility of the polymers. However, R may be any substituent selected from the group consisting of a substituted or unsubstituted aryl group containing from 6 to 11 carbon atoms or a substituted or unsubstituted alkyl group containing from 1 to 11 carbon atoms. The substituent R may therefore be alkyl, such as methyl, ethyl, propyl, butyl, isobutyl, etc, or aryl, such as a phenyl group or substituted phenyl group. Preferably, the substituent R, in at least about 50 percent of said units, is alkyl containing from 1 to 11 carbon atoms. Most preferably, the alkyl is ethyl. The symbol n is an integer which provides said polymer with a molecular weight of from about 5000 to about 1,000,000, preferably 50,000 to 500,000. Generally, n is the molecular weight of the polymer divided by the molecular weight of the monomer. For example, the preferred monomer ethyloxazoline, has a molecular weight of 99.13 (~100). When the desired polyethyloxazoline molecular weight is about 5000, n is about 50; when the desired polyethyloxazoline molecular weight is about 1,000,000, n is about 10,000.

Thus, the polymers used in the creping adhesive may be homopolymers or copolymers depending upon whether the substituents R are the same for all units of the above formula or are different. In the case of copolymers, they may be either heteric or block copolymers.

Particularly preferred oxazoline polymers of this invention are polyethyloxazolines having molecular weights in the range of about 5000 to about 500,000 daltons. Such homopolymers are thermoplastic, amorphous solids which are water-soluble and have low toxicity. One such homopolymer is poly(2-ethyl-2-oxazoline) which has a molecular weight of about 500,000 and a structure as follows:

art. Such modified PEIs include, without limitation, ethoxylated PEI and other modified PEIs, such as those described in 21 CFR 175.103.

This multipolymer blend is then mixed with polyethyoxazoline to form a creping adhesive concentrate of the invention. In another preferred embodiment, the multipoly-

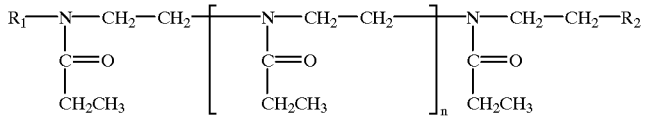

where n is about 5,000, providing a molecular weight of about 500,000.

The monomers from which the polymers of this invention are formed may be prepared according the procedures described in Chemical Reviews, 71, No. 5, pages 483–505 (1971), incorporated herein by reference. Suitable illustrative monomers include 2-methyl, 2-ethyl, and 2-isobutyl-2-oxazoline and mixtures of these monomers.

The polymers, whether homopolymers or copolymers, used in the process of this invention may be prepared by polymerizing the monomers or comonomers in a suitable manner. According to U.S. Pat. No. 3,483,141, the monomers may be reacted in an inert atmosphere in the presence of a cation catalyst at a temperature of about 20° C. to 250° C. See also Polymer Letters, 4, pages 441–445 (1966).

The polymerization temperature preferably is in the range of from about 80° C. to 250° C., with reaction times of several hours. These reaction times can vary somewhat depending upon the reactants, polymerization temperature, catalyst type and concentration, and the desired molecular weight.

Typical of the cationic catalysts which may be used in the polymerization reaction are alkyl halides such as methyl iodide and 1,4-dibromobutane; boron-fluorine compounds such as boron trifluoride etherate, strong acids such as p-toluene sulfonic acid, sulfuric acid, nitric acid and the like. The concentration of catalyst can vary considerably so that the mole ratio of monomer to catalyst is from about 10:1 to 60,000:1.

B. The Multipolymer

The multipolymer component of the creping adhesive of this invention may be included in an amount up to that concentration which produces gel. For example, the multipolymer may make up between about 1–25 wt % of the creping adhesive concentrate. Optionally, although less desired, these compositions may further comprise polyamide resins. Suitable polyamide resins known to those of skill in the art include but are not limited to the polyamide resins provided in the Code of Federal Regulations (CFR) 21 parts: §176.170, §175.300 and §176.180, which are incorporated by reference herein, and are discussed in detail in parent application Ser. No. 08/595,939, filed Feb. 6, 1996, which is also incorporated by reference herein.

Thus, in a preferred embodiment, the multipolymer composition is a blend of polyethyleneimine (PEI) and epihalohydrin-modified PEI. A suitable PEI for use in the composition of the invention may be readily selected by one of skill in the art. Preferably, however, a PEI useful in the invention is characterized by a molecular weight between about 700 to about 750,000. Alternatively, another suitable modified PEI may be readily selected by one of skill in the mer is mixed with polyethyloxazoline and polyvinylalcohol to form a creping adhesive concentrate of the invention.

Desirably, the halogen of the epihalohydrin of these formulations is chlorine. However, other suitable halogens, e.g. bromide, may be readily substituted by one of skill in the art. Further, the formulation for a suitable multipolymer composition may be adjusted as needed or desired. As another example of a multipolymer formula, one of skill in the art can readily select an alternative pH adjuster and thus, substitute another appropriate acid or base capable of adjusting the pH to the desired range using sulfuric acid, sodium hydrosulfite, or another appropriate pH adjuster. One of skill in the art can readily utilize an inorganic acid such as phosphoric acid, inorganic base such as sodium hydroxide, an organic acid such as citric acid, or organic base such as diethylenetriamine, to adjust the pH. Similarly, one of skill in the art can readily select from among the known preservatives. For example, suitable preservatives include KATHON®, PABA®, PROXEL®, and triazines.

C. Water

The water used in preparing the compositions of the invention is preferably soft water, i.e., water which is free of calcium and magnesium, although such soft water is not a requirement. Prior to use, a creping adhesive concentrate of the invention is diluted using water to about 0.01 percent to about 4 percent solids. Optionally, the concentrate may use a release agent, many of which are known in the art.

D. Optional Components of Creping Adhesive Concentrate

Other optional components may be readily added into the above multipolymer formulations. Such optional components may include, for example, corrosion inhibitors to prevent rust formation of the dryer, such as salts of carboxylic acids and/or sodium nitrite.

Additionally, or as an alternative to adding the optional ingredients discussed above (e.g. pH adjusters, corrosion inhibitors, and preservatives) into the creping adhesive concentrate, such components may be added at the time of dilution. The pH of the creping adhesive concentrate is adjusted to a pH of between 4 and 9, to avoid corrosion of the dryer.

Preferably, the creping adhesives of the invention comprise polyoxazoline with multipolymer systems, rather than the two polymer systems described above. For example, the polyoxazoline may be combined with such components as polyvinylamides, polyvinylalcohols (PVA), glyoxylated polyvinylamides, polyethylene oxide, polyethylenimine, modified polyethyleneimine, polyvinylpyrrolidone, and carbowax™. As with other polymer systems, polyoxazoline can be readily added into these multipolymer systems. Desirable formulations includes a combination of polyvinylalcohol and polyethyloxazoline; a combination of polyethylenimine and polyethyloxazoline; a combination of modified polyethylenimine and polyethyloxazoline, and other combinations of these polymers. One particularly desirable formulation includes a combination of polyvinylalcohol, polyethyloxazoline, polyethylenimine, and modified polyethyleneimine.

In one particularly preferred embodiment, the creping adhesive concentrate contains about 4.5% of a mixture of epichlorohydrin-modified polyethyleneimine and unmodified polyethyleneimine and about 3% polyethyloxazoline, optionally with one or more corrosion inhibitors, biocides, or preservatives, with the balance of the creping adhesive being water. In another preferred embodiment, the creping adhesive contains about 7.5% of a mixture of polyvinylalcohol, polyethyleneimine, and epi-modified polyethyleneimine of Example 3, and about 3% polyethyloxazoline, optionally with one or more corrosion inhibitors, biocides, or preservatives, with the balance of the creping adhesive being water. FDA-approved corrosion inhibitors, biocides, or preservatives may be readily selected, where desired.

Suitable polyvinylalcohols may be obtained from a variety of commercial sources, e.g., Air Products, or produced using known methods. For example, polyvinylalcohols vary in characteristics such as molecular weight, and percentage hydrolyzed. [Poly(vinyl alcohol) is derived from poly(vinyl acetate) by hydrolysis of the acetate function. Typically, a fraction of the acetate functions are left intact to impart different properties. The percent hydrolysis refers to the fraction of acetate groups which have been hydrolyzed to hydroxyl moieties.] For example, useful polyvinylalcohols include hydrolyzed, intermediate hydrolyzed, partially hydrolyzed, or superhydrolyzed polyvinylalcohols, among others which are readily selected by those in the art and those which are described in Title 21 of the Code of Federal Regulation.

These creping adhesives, and all the adhesives of the invention, are used by applying it to a creping cylinder, e.g. a Yankee Dryer, a through-air dryer, or equivalent equipment, for example by spraying directly onto a dryer.

II. Methods of Use

Thus, the present invention provides a method for manufacturing paper products. The method of the invention provides improved dispersibility, adhesion, coating and thus, paper machine runnability, i.e., there are fewer problems in paper runs and thus a decrease in the number of times a machine must be stopped and re-started. Thus, the use of the creping adhesive of the invention results in more usable paper, which has even edges and color and fewer holes. The method of the invention also improves resistance to bleach out when paper colors are changed. Improved paper softness may also result.

The method of the invention involves applying the creping adhesives of the invention to a creping cylinder or dryer. Preferably, the creping adhesives of the invention are diluted with water, as defined above, so that the resulting percentage of solids in the diluted composition are about 0.1% to about 5% by weight. Alternately, one of skill in the art could apply the polymers individually or in combination to the creping cylinder or dryer.

Preferably, the creping adhesives of the invention are applied directly to a drying cylinder used in the preparation of cellulosic web used to make tissue products. For example, the creping adhesives are desirably sprayed onto the cylinder, e.g. a Yankee dryer or a through-air dryer, at a rate of between about 25 to 100 cc/minute, and preferably about 30 cc/minutes, operating at 150–250° F. temperature. However, one of skill in the art may adjust this rate as needed, depending upon such variables such as, e.g., temperature, width and speed spray boom, furnish, stock, creping adhesive concentration, other chemicals present, and the dryer conditions.

Optionally, the creping adhesives of the invention may be applied to the drying cylinder in conjunction with other agents. In one particularly desired embodiment, the creping adhesive of the invention is applied in conjunction with a release agent or glycerine. Such release agents are well known to those of skill in the art. For example such agents may include oils, emulsions, dispersions, and surfactants, which are known to those of skill in the art.

Typically, the creping adhesive and release agent are sprayed using separate feed lines and either the same or different spray booms. During application, adjustments in the concentrations of these components are made based upon visual inspection of the dryer, sensory equipment analysis of the dryer and paper during the run, and analysis of the resulting paper.

The following examples illustrate the preferred methods for preparing and using the creping adhesives of the invention. These examples are illustrative only and do not limit the scope of the invention.

EXAMPLE 1

Adhesive Strength Tests

This example provides data showing the adhesive strength of exemplary creping adhesives of the invention as measured on the Tinius-Olsen Testing Machine Model 5000 [Tinius Olsen Testing Machine Co.; Willow Grove, Pa.] by a 180° Peel Test Method, which is a modification of the ASTM method D903.

A. Sample Preparation:

1. Steel plates [Catalog No. 101-A-2, SAE 1010 cold rolled heavy gauge steel plates, Metaspec Co.; San Antonio, Tex. or equivalent] were submerged in a petroleum ether bath for at least 2 hours to remove the rust preventative coating. The plates were then washed with CERFAK® 1400 surfactant, rinsed with acetone, and then air-dried.

2. 1"×8" non-woven fabric strips (cut from interfacing; 30% natural cellulose/70% polyester, Staple Sewing Aids Corp., NJ) were cut from the bulk interfacing material such that all strips were cut in the same direction and so that the same side of the fabric adhered to the metal plate.

3. The fabric strips were placed in the test solutions and thoroughly soaked for at least 15 minutes. A minimum of two strips was run per sample.

After soaking, the fabric strips were removed from the solution and allowed to drip off. Next the strips were placed onto the metal surface so that one end of the fabric strip was flush with the edge of the metal plate. The strip was centered.

The fabric strip was smoothed onto the metal surface such that no air bubbles formed under the fabric strip. A "fabric tail" of 3 inches served as the end placed into the testing machine's upper clamp.

4. The fabric coated plate was then placed onto a preheated (15 minutes minimum) Corning Hot Plate Stirrer (model #PC351) on setting 4 (480° F.) for four minutes (the thinner plates were cured on low (180–200° F.) for four minutes). After heating, the sample was allowed to cool to room temperature. The fabric "tail" may be blotted to hasten its drying.

5. The sample plate was placed in the testing machine's lower clamp, after first debonding about 1"of the bound fabric from the metal plate. The fabric "tail" was 180° from the upper clamp. The "tail" was then placed into the testing machine's upper clamp such that it was bent back upon itself.

6. Tinius Olsen Machine Settings:
Force=50%=2.50 lbs.
Ext.=100=5.0 in.
Speed=2.50 in./min.

7. The Tinius Olsen Testing Machine evenly pulled the fabric strip from the metal plate while simultaneously recording the adhesive force and distance the cross-hair has travelled.

8. Adhesive strength measurements were reported as Force per width of adhesive strip. Force measurements were between 15–85% of load cell weight.

The purpose of the Peel Test is to test additives and alterations to the creping adhesives of the invention. Adhesive strength was related to the effectiveness of the Yankee Dryer creping process.

EXAMPLE 2

Preparation of Creping Adhesives

An exemplary creping adhesive of the invention was prepared as follows.

A. Polyethyeneimine (PEI)+Modified PEI+ Polyethyloxazoline Creping Adhesive

| Material | Weight Percent (%) |
| --- | --- |
| Soft Water | 77.8 |
| Polyethyloxazoline (500,000 MW) | 3.0 |
| Polyethyleneimine (25,000 MW) | 1.3 |
| Modified PEI | 17.7 |
| Biocide | 0.2 |

The polyethyleneimine was obtained from a commercial source (BASF). The epichlorohydrin-modified PEI can be obtained commercially, or by known methods. For example, the epichlorohydrin-modified PEI (epi-modified PEI) can be obtained by reacting the PEI with epichlorohydrin via alkylation to form the quaternized PEI-EPI polymer or, alternatively, by reacting the ethyleneimine monomer with epichlorohydrin as the ethyleneimine is being polymerized. Any desired biocide may be used.

Using a clean kettle equipped with top agitation and a nitrogen gas inlet for the bottom of the tank, the reactor is charged with soft water. While mixing, the polyethyloxazoline is added into the vortex and the reactor is heated to 95–105° F. and held at that temperature range until the polyethyloxazoline is completely dissolved. The reactor is then cooled to ambient temperature.

Polyethyleneimine is added into the vortex slowly and mixed for at least 30 minutes to avoid gel particle formation. The epichlorohydrin-modified polyethyleneimine and the biocide are then added. The resulting product, is adjusted to a pH of between 8.5–9.5, has a faint yellow color (<2.5, ASTM D1500), and a non-volatile content of 6–7.5. The liquid is drawn through a 40–80 mesh strainer or a finer filter bag.

Adhesive strength was measured as described in Example 1 above following dilution of the concentrate with water to 3% solids. Glass transition temperature was measured using a differential scanning calorimeter and conventional techniques.

The polyethyeneimine/modified PEI/polyethyloxazoline creping adhesive of Example 2 of the invention has an adhesive force of 0.61 lb/in and a glass transition temperature of 95° C. This creping adhesive has been found to perform well, with little to no breaks and has been run successfully on a through-air dryer on all grades from tissue to toweling. Thus, the inventors have found that the formulations of the invention which contain polyethyloxazoline are advantageous because they do not deteriorate at the higher operating temperatures of the through-air dryer and are more easily removed than the prior art compositions, particularly those which contain polyvinylalcohol in the absence of polyethyleneoxazoline.

EXAMPLE 3

Polyethyeneimine (PEI)+Modified PEI+ Polyethyloxazoline+Polyvinylalcohol Creping Adhesive An exemplary creping adhesive of the invention was prepared as follows.

| Material | Weight Percent (%) |
| --- | --- |
| Soft Water | 69.7 |
| polyvinylalcohol | 3.0 |
| polyethyloxazoline (500,000 MW) | 3.0 |
| polyethyleneimine modified with epichlorohydrin | 23.5 |
| polyethyleneimine | 0.5 |
| pH adjuster | 0.3 |

A glass-lined, stainless steel reactor or blending tank, equipped with top agitation and a nitrogen gas inlet for the bottom of the tank, is charged with soft water. While mixing, the polyvinylalcohol is added into the vortex. The reactor is heated to 180–185° F. and held at that temperature range until the polyvinylalcohol is completely dissolved. The reactor is then cooled to 90–100° F. Following cooling, polyethyloxazoline is added into the vortex and mix until fully dissolved. Once the polyethyloxazoline has completely dissolved, the heat is removed and the reactor allowed to cool. Following cooling, the modified polyethyleneimine and unmodified polyethyleneimine are added and the pH adjusted to 7.5–9.0. The resulting product has a light amber color (<2.5, ASTM D-1500). The resulting adhesive concentrate contains 10–11% solids.

Adhesive strength was measured as described in Example 1 above following dilution of the concentrate with water to 3% solids. Glass transition temperature was measured using a differential scanning calorimeter and conventional techniques.

The polyethyeneimine/modified PEI/polyethyloxazoline/ polyvinylalcohol creping adhesive of Example 3 of the invention has an adhesive force of 0.53 lb/in and a glass transition temperature of 51° C.

In an early field trial, polyethyeneimine/modified PEI/ polyethyloxazoline/polyvinylalcohol creping adhesive of the invention exhibited improved hand feel and a more uniform coating on the surface of the Yankee dryer, relative to dimethylglutarate-diethylenetriamine-epichlorohydrin (DMG-DETA-EPI) resin. Briefly, the trials were on #6 tissue machine which produces 9.2# tissue grades. The machine has layering capability and runs 100% eucalyptus fiber against the Yankee dryer. The trials were run by keeping the flow rates of the coatings constant and adjusting the crepe ratio to compensate for any variation in sheet adhesion. The release agent was kept at a constant rate of 3 cc/ton throughout the trial. When the PEI-modified PEI-polyethyloxazoline-polyvinylalcohol creping adhesive of the invention was substituted at 0.5# for DMG-DETA-EPI at 1 #/ton (based on polymer solids), the transition was smooth. Within twenty minutes there was noticeable improvement in the uniformity of the coating on the Yankee surface. The first full reel of paper after the transition showed an improvement in crepe fineness and uniformity.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A process for improved paper machine runnability in the production of paper which comprises the steps of:
   (a) providing a creping adhesive concentrate comprising water and about 1 percent to about 25 percent by weight of solids, said solids consisting of a blend comprising an oxazoline polymer, a first polyethyleneimine, and a second modified polyethyleneimine;
   (b) diluting to about 0.1 to about 5 percent by weight solids the creping adhesive; and
   (c) applying said creping adhesive to a drying cylinder.

2. The process according to claim 1 wherein the creping adhesive is applied to the drying cylinder in association with the application of a release agent.

3. The process according to claim 1 wherein said blend further comprises polyvinylalcohol.

4. The process according to claim 1 wherein the solids from the creping adhesive consist essentially of polyethyeneimine, epihalohydrin-modified polyethyleneimine, polyethyloxazoline and polyvinylalcohol.

5. The process according to claim 1 wherein the first polyethyleneimine has a molecular weight of between 700 to 750,000.

6. The process according to claim 1 wherein the second modified polyethyleneimine is selected from the group consisting of epichlorohydrin-modified polyethyleneimine and ethoxylated polyethyleneimine.

7. The process according to claim 1 wherein the oxazoline polymer has the structure

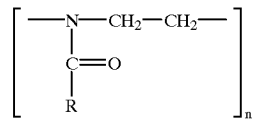

where R is selected from the group consisting of a substituted or unsubstituted aryl group containing from 6 to 11 carbon atoms or a substituted or unsubstituted alkyl group containing from 1 to 11 carbon atoms, and n is an integer which provides said polymer with a molecular weight of from about 5000 to about 1,000,000.

8. The process according to claim 7 wherein the molecular weight of the oxazoline polymer is between about 50,000 to about 500,000.

9. The process according to claim 1 wherein the adhesive comprises a total of about 10 percent by weight solids.

10. The process according to claim 1 wherein said oxazoline polymer is present in the creping adhesive in an amount of about 3 percent by weight.

11. The process according to claim 1 wherein the oxazoline polymer is polyethyloxazoline.

12. The process according to claim 1 wherein the polyethyloxazoline has a molecular weight of about 500,000.

13. The process according to claim 1 wherein the concentrate further contains a pH adjuster, a corrosion inhibitor, and a preservative.

14. A process for improved paper machine runnability in the production of paper which comprises the steps of:
   (a) providing a creping adhesive concentrate comprising polyethyloxazoline, a first polyethyleneimine, a second modified polyethyleneimine, and water, wherein the concentrate comprises about 10 percent by weight solids;
   (b) diluting to about 0.1 to about 5 percent by weight solids the creping adhesive; and
   (c) applying said creping adhesive to a drying cylinder.

15. A process for improved paper machine runnability in the production of paper which comprises the steps of:
   (a) providing a creping adhesive concentrate comprising about 3 percent by weight polyethyloxazoline, about 4.5 percent by weight of a mixture of epichlorohydrin-modified polyethyleneimine and unmodified polyethyleneimine, and water;
   (b) diluting to about 0.1 to about 5 percent by weight solids the creping adhesive; and
   (c) applying said creping adhesive to a drying cylinder.

* * * * *